(12) United States Patent
Rzepecki, II et al.

(10) Patent No.: US 7,597,650 B2
(45) Date of Patent: Oct. 6, 2009

(54) AUTOMATIC TRANSMISSION WITH NEUTRAL COAST DOWN FEATURE

(75) Inventors: John M. Rzepecki, II, Clinton Township, MI (US); Michael E. Fingerman, West Bloomfield, MI (US); Andrew J. Harkenrider, Rochester Hills, MI (US); Mark J. Duty, Goodrich, MI (US); Yi Cheng, Ann Arbor, MI (US); Michael L. Plunkett, Lake Orion, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 335 days.

(21) Appl. No.: 11/386,913

(22) Filed: Mar. 22, 2006

(65) Prior Publication Data
US 2007/0225114 A1    Sep. 27, 2007

(51) Int. Cl.
*B60W 10/04*    (2006.01)
*B60W 10/10*    (2006.01)
(52) U.S. Cl. .................... 477/110; 477/118
(58) Field of Classification Search ............. 477/107, 477/110, 118, 119, 169, 171, 173, 174, 175, 477/176, 184, 185, 901, 904
See application file for complete search history.

(56) References Cited

U.S. PATENT DOCUMENTS

| 4,514,811 | A | | 4/1985 | Daubenmier et al. |
|---|---|---|---|---|
| 4,637,278 | A | | 1/1987 | Nishikawa et al. |
| 4,697,471 | A | | 10/1987 | Hiketa |
| 5,161,432 | A | * | 11/1992 | Matsumoto et al. ......... 477/119 |
| 5,393,278 | A | * | 2/1995 | Kyushima et al. ........... 477/120 |
| 5,517,411 | A | | 5/1996 | Genise et al. |
| 5,535,863 | A | * | 7/1996 | Vukovich et al. ............ 192/3.3 |
| 5,655,996 | A | | 8/1997 | Ohtsuka |
| 6,307,277 | B1 | | 10/2001 | Tamai et al. |
| 6,376,927 | B1 | | 4/2002 | Tamai et al. |
| 6,832,978 | B2 | * | 12/2004 | Buchanan et al. ........... 477/174 |
| 6,991,585 | B2 | * | 1/2006 | Colvin et al. ............... 477/174 |

FOREIGN PATENT DOCUMENTS

| JP | 55145027 A | 12/1980 |
|---|---|---|
| JP | 59025042 A | 2/1984 |

* cited by examiner

*Primary Examiner*—David D. Le
(74) *Attorney, Agent, or Firm*—Ralph E. Smith

(57) ABSTRACT

A system for controlling the engagement and disengagement of one or more clutches that are adapted to operatively connect an engine and an automatic transmission includes a control device for determining if a negative torque condition exists and for providing an output or signal to decrease the rotational speed of the engine in response to the determination of the existence of the negative torque condition.

21 Claims, 3 Drawing Sheets

AUTOMATIC TRANSMISSION WITH NEUTRAL COAST DOWN FEATURE

TECHNICAL FIELD

The present invention generally relates to an automatic transmission system and in particular to an automatic transmission system capable of providing improved fuel economy in connection with a negative torque condition.

BACKGROUND

A factor that effects a vehicle's fuel efficiency is the load experienced by the engine. If the engine experiences a high load, or runs at high revolutions per minute, fuel efficiency typically is reduced. On the other hand, if the engine is unloaded, or runs at a relatively lower number of revolutions per minute, the fuel efficiency commonly improves.

The load experienced by the engine may be directly related to the associated gear ratio in which the transmission is operating. Too high a numerical gear ratio may cause the engine to run too fast and fail to operate at a desired level of fuel efficiency. Conversely, an extremely low numerical gear ratio may adversely affect vehicle performance characteristics, including acceleration and ease of operation. Accordingly, communication between the engine and the transmission in determining the load experienced by the engine and determining a desired or proper gear ratio can improve fuel efficiency.

SUMMARY

A system for controlling the engagement and disengagement of one or more clutches that are adapted to operatively connect an engine and an automatic transmission. The system including a control system for determining if a negative torque condition exists and to provide an output or signal to decrease the rotational speed of said engine in response to the determination of the existence of a negative torque condition.

DETAILED DESCRIPTION

Figure 1:
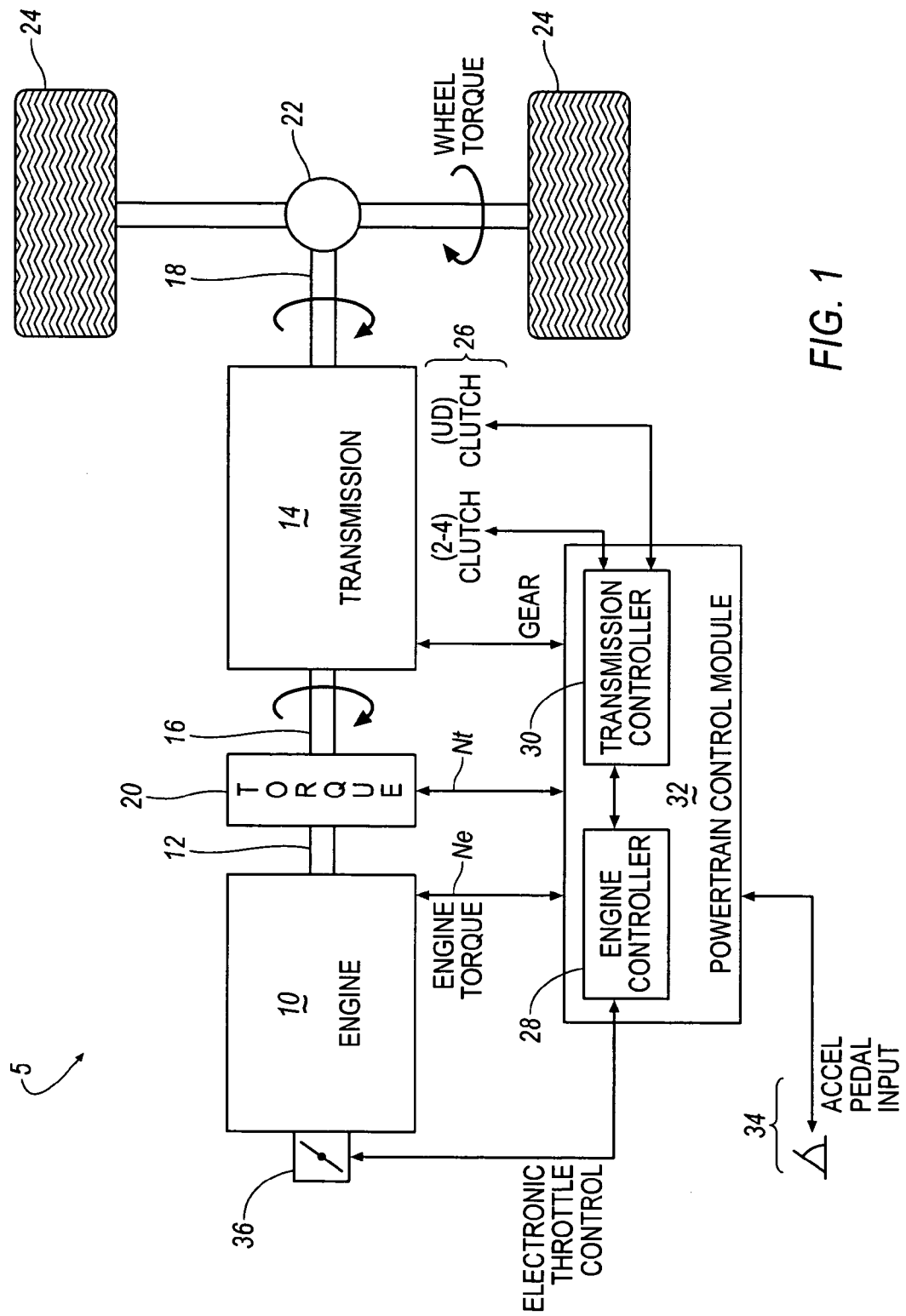
FIG. 1 is a functional block diagram of a vehicle powertrain system, including an automatic transmission, according to an embodiment of the invention.

Referring to FIG. 1, a schematic illustration of an exemplary powertrain system 5 is shown. The powertrain system 5 includes an engine 10 having an output shaft 12 and an automatic transmission 14 having an input shaft 16 and an output shaft 18. Positioned between engine output shaft 12 and transmission input shaft 16 is a torque converter 20. Torque converter 20 may further include an impellor, a turbine and a stator. The output shaft 18 is commonly in communication with a differential assembly 22, which in turn provides torque to a plurality of wheels 24.

The automatic transmission 14 may be a continuously variable transmission, such as a belt driven transmission, or may be a fixed ratio transmission, such as a planetary transmission, or may be a step-change transmission, with an automated clutch and automated gear changes. Thus, it can be appreciated that the invention is not limited by the design, or type, of automatic transmission. The automatic transmission 14 may include a plurality of clutches that are capable of being engaged and disengaged, or vented, to connect and/or disconnect the output shaft 12 of the engine 10 with the input shaft 16 of the automatic transmission 14, respectively.

The engine 10 may be in communication with an engine controller 28 and the transmission 14 may be in communication with a transmission controller 30, either or both which may be integrated into or be provided in communication with a control module or control device 32, such as a computer module, a powertrain control module (PCM), or the like. While the invention is described below as having an engine controller 28 and a transmission controller 30 that together form or function as part of a control device, it can be appreciated that the invention may be practiced with engine 10 and the transmission 14 in direct communication with a control device 32 that functions as or includes (or integrates) an engine controller and/or a transmission controller, thereby eliminating the need for a separate engine controller 28 and/or a separate transmission controller 30.

In the illustrated embodiment, the control device 32 receives powertrain operating conditions from various sensors and can communicate output control signals to the engine 10 and the transmission 14. The sensors providing input to the control device (shown in the illustrated embodiment in the form of a PCM) may include, without limitation, an engine speed sensor (not shown), a turbine output shaft sensor (not shown), an accelerator pedal input sensor 34, and/or a vehicle speed sensor (not shown). An engine speed sensor may detect, for example, revolutions of an engine output shaft 12 and may provide or generate a signal indicative of the detected engine revolutions per minute (Ne). A turbine output shaft sensor may detect, for example, revolutions of a turbine output shaft and provide or generate a signal indicative of the detected revolutions per minute (Nt). An accelerator pedal input sensor (e.g., sensor 34) may detect, for example, the degree of depression or position of an accelerator pedal and provide or generate a signal indicative of the detected accelerator pedal position. Further, a vehicle speed sensor may detect for example, the speed at which the vehicle is currently traveling and provide or generate a signal indicative of a detected speed.

The control device 32 or the engine controller 28 may further include an electronic throttle control 36. The throttle control 36 is capable of detecting, for example, the position or degree of opening of an engine throttle or throttle pedal position and providing or generating a signal indicative of detected throttle opening and/or throttle position.

The control device 32 or the transmission controller 30 may regulate, or control, the engagement and disengagement of one or more clutches 26 (which are only generically identified in connection with FIG. 1) based upon input or signals received from an electronic throttle control 36 and a vehicle speed sensor. It is to be understood that the invention is not limited to a specific clutch configuration, including that generally set forth in connection with FIG. 1.

Figure 3:
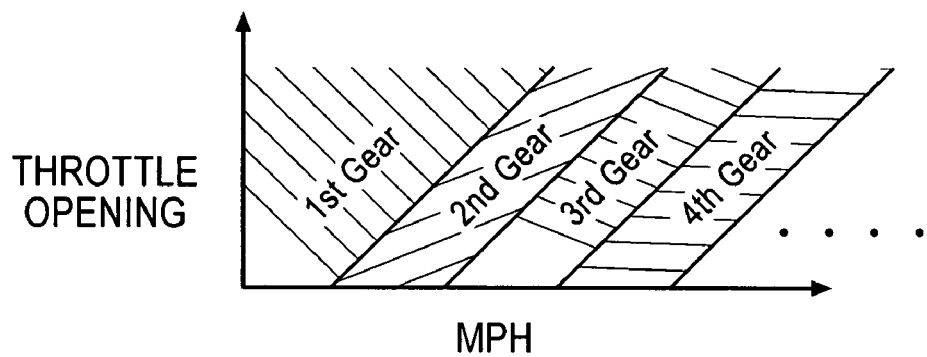
FIG. 3 is a gear selection graph according to an embodiment of the invention in which gear selection ranges are associated with throttle position and vehicle speed.

Referring to FIG. 3, the selection, or determination, of a desired or appropriate gear for the transmission 14 may be determined based upon signals or information provided concerning throttle opening/position and vehicle speed. In turn, the gear selection will, at least in part, determine which combination of clutches 26 should be engaged or disengaged with respect to the transmission 14. Four gears are represented in FIG. 3. However, it can be appreciated that the system is not limited to three gears and may be practiced by including more or less gears.

The engine controller 28 and the transmission controller 30 may be configured for direct communication between each other. For instance, if the transmission 14 is in neutral, i.e., the clutches 26 are disengaged or vented, the transmission controller 30 may provide a signal to the engine controller 28 signaling that the transmission 14 is not loaded, or that a lower torque requirement may be present or occurring. In turn, the engine controller 28 may provide a signal to the engine 10 to reduce engine speed, or run at a lower number of revolutions per minute (rpm), which can result in fuel savings.

Figure 2:
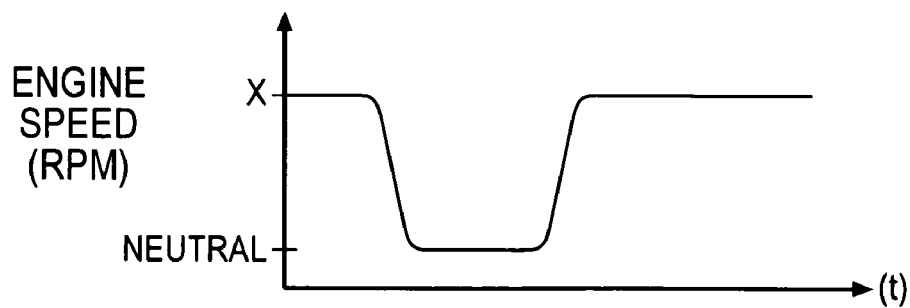
FIG. 2 is a graph of an engine speed curve that generally illustrates a speed curve when the engine is in a loaded condition and a neutral condition.

In contrast, if the transmission 14 is in gear, i.e. the clutches 26 are engaged, the transmission controller 30 may provide a signal to the engine controller 28 signaling that the transmission 14 is loaded, or that an increased torque requirement may be present or occurring. In turn, the engine controller 28 may provide a signal to the engine 10 to increase or ramp up the engine speed or rpm. FIG. 2 illustrates a general example of an engine speed curve in accordance with an embodiment of the invention. The illustrated graph depicts an engine speed curve through a period of time in which the engine 10 is loaded, i.e., running at X rpm, and when the engine 10 is unloaded, or in a neutral condition.

In certain situations, the powertrain system 5 may experience a negative torque condition. A negative torque condition may occur, for example, when the engine 10 is not producing an overall positive torque within the powertrain system 5, when the turbine is revolving at a higher rate than the impeller within the torque converter 20, or when the turbine is revolving at a higher rate than the engine 10, i.e. when the transmission 14 is attempting to drive the engine 10. By way of example, and without limitation, a negative torque condition may be present when the following conditions exist:

(1) the engine's revolutions per minute is less than the turbine's revolutions per minute plus a constant (Ne<Nt+a constant); and
 (2) the electronic throttle control sensor senses a throttle opening less than a given number of degrees (e.g., 2 degrees (thr<2°)); and
 (3) the above conditions are present for a select or predetermined time, for example, 1.3 seconds.

Such a situation may occur, for instance, when the operator of a vehicle requests a deceleration of the vehicle by engaging the brakes, or by initiating a neutral coast down situation by removing or reducing pressure on the accelerator pedal. When such a situation occurs, the engine 10 may be running at a higher rpm than necessary based upon the torque output of the transmission. Accordingly, the engine's rpm may be reduced to help improve associated fuel efficiency.

Figure 5:
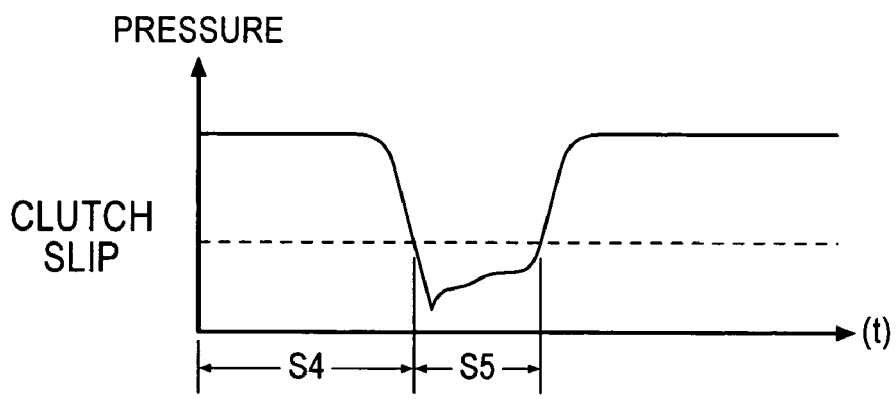
FIG. 5 is a graph generally illustrating a disengagement and pre-engagement of a clutch during a negative torque condition.
Figure 4:
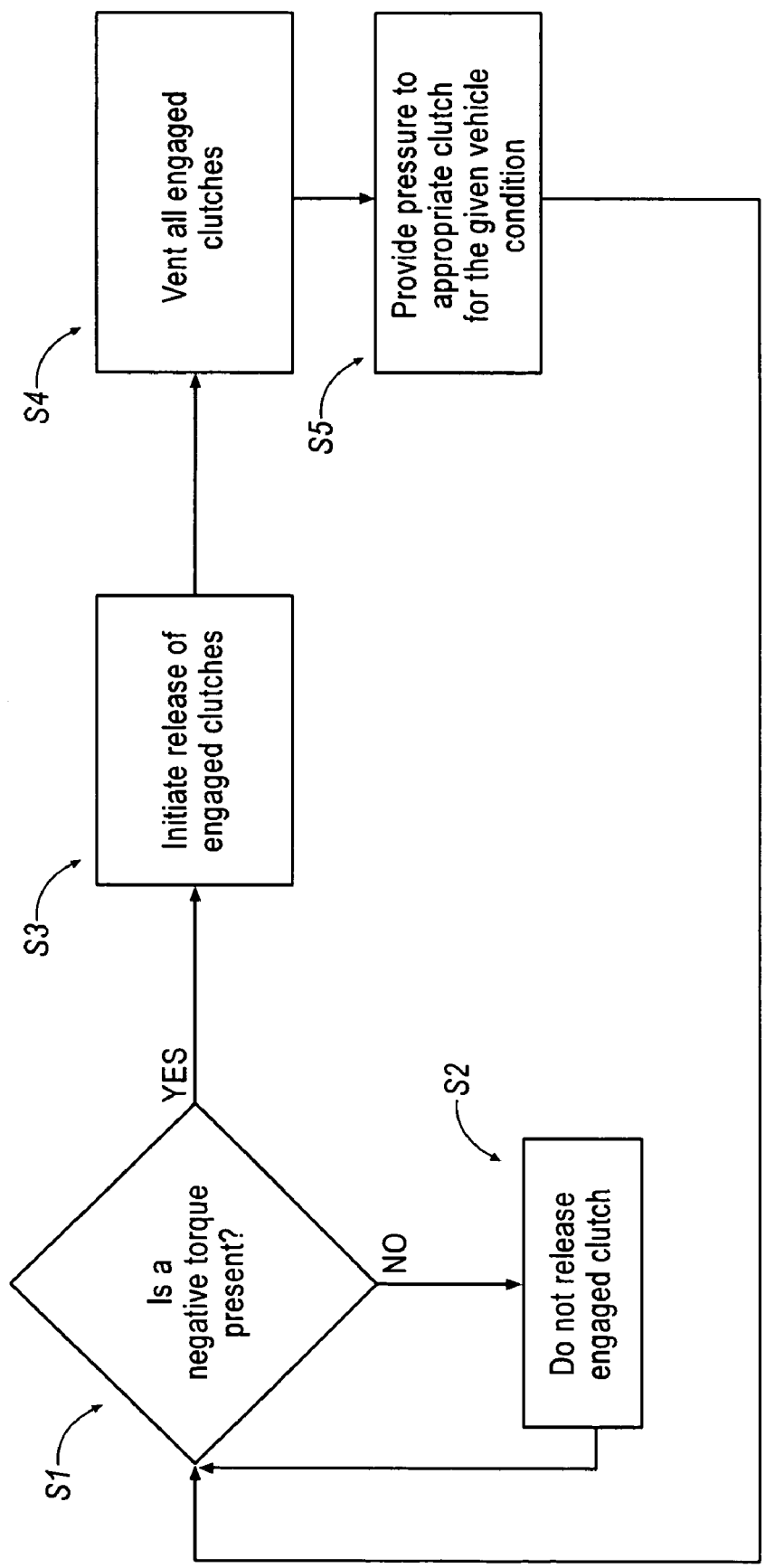
FIG. 4 is a functional flow chart of a powertrain response according to an embodiment of the invention.

Referring now to FIGS. 4 and 5, a flowchart illustrates a response by the powertrain system 5 to a negative torque condition which, among other things, may improve the fuel efficiency of the powertrain system 5. In the illustrated embodiment of the response, a control device 32 (or its functional equivalent) determines if a negative torque condition is or may be occurring based upon signals provided by or received from an engine controller 28 and a transmission controller 30 (step S1). If it is determined that a negative torque condition is not present or occurring, the powertrain system 5 may continue as it is currently operating, the clutches 26 engaged to the transmission 14 remain engaged (step S2) and the system returns or loops back to the initial inquiry (step S1).

Conversely, if the control device 32 (or its functional equivalent) determines that a negative torque condition is present, then the control device 32 provides a signal to the transmission controller 30 to initiate the release, or venting, of the engaged clutches 26 (step S3). Once the transmission controller 30 receives the signal from the control device 32, all clutches 26 engaged to the transmission 14 can be vented, or disengaged (step S4). When all clutches 26 are vented, the transmission 14 is in neutral gear condition.

The control device 32 then may continue to analyze current vehicle operating conditions, including vehicle speed and throttle position, to determine which clutches 26 should or would be desirably engaged once the negative torque condition is canceled or no longer exists. Once the control device 32 has determined which clutch combination is appropriate, a select or predetermined amount of pressure may be provided to at least one of the clutches 26 in preparation for the engagement of the appropriate clutch configuration once the negative torque condition has passed or no longer exists (step S5). For instance, the select or predetermined amount of pressure may be slightly less than the pressure necessary to keep the clutch(es) from slipping, or may be a percentage of the total pressure applied to the clutch(es) during engagement.

Referring to FIG. 5, a graph is presented that generally illustrates the pressure applied or removed from the clutches during steps S4 and S5. As illustrated, during step S4, pressure is removed from the engaged clutches such that the clutches may slip, or become disengaged. Once that occurs, during step S5, pressure is applied to at least one clutch so that once the negative torque condition is abated or removed and only a minimal amount of pressure may be necessary to engage the clutch. Applying the select or predetermined amount of pressure to one of the clutches 26 typically reduces the amount of time necessary for clutches 26 to engage the transmission 14 once the negative torque condition is no longer present. As a result, the transmission 14 may transition more smoothly from neutral to a loaded or in-gear condition.

Once the negative torque condition is canceled or no longer exists, the appropriate clutches 26 may be engaged to the transmission 14 and a signal may be provided by the transmission controller 30 to the engine controller 28 to increase engine speed accordingly. For instance, the negative torque condition may be canceled by a driver when an accelerator pedal is depressed to increase the vehicle's acceleration. In another example, the negative torque condition may be canceled automatically if the control device 32 senses that vehicle speed is increasing despite the prior application of brakes. In a further example, if the control device 32 senses that vehicle acceleration is changing beyond a select or predetermined rate, the clutches may be automatically engaged to the transmission for safety purposes. Either of the foregoing situations could be present if the vehicle is heading down a hill or slope.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed:

1. A system for controlling engagement and disengagement of one or more clutches that are adapted to operatively connect an engine and an automatic transmission of a vehicle, the system comprising:
   a torque convener coupling an engine to an automatic transmission having one or more gear-selection clutches,
   a control device configured to obtain or receive a rotational speed of said engine, to obtain or receive a rotational speed of said automatic transmission, and to determine if a negative torque condition exists,
   wherein the control device causes selective disengagement of each one of said one or more clutches putting said automatic transmission in neutral gear in response to a determination that the negative torque condition exists.

2. The system according to claim 1, wherein the negative torque condition is determined to exist when the rotational speed of said transmission is greater than the rotational speed of said engine.

3. The system according to claim 1, wherein the control device is further configured to determine if the negative torque condition no longer exists and wherein said one or more clutches are selectively re-engaged putting said transmission into gear in response to a determination that the negative torque condition no longer exists.

4. The system according to claim 3, wherein said one or more clutches are selectively pressurized to a select or predetermined pressure during the presence of the negative torque condition prior to re-engagement to said automatic transmission.

5. The system according to claim 1, further including a sensor adapted to signal or determine an actuation of an accelerator pedal or a deactivation of the accelerator pedal.

6. The system according to claim 5. wherein the deactivation of the accelerator pedal is a parameter used by the control device to determine the existence of the negative torque condition.

7. The system according to claim 1, further including a sensor for signaling or determining actuation or deactivation of a brake pedal.

8. The system according to claim 7, wherein the actuation of the brake pedal is a parameter used by the control device to determine the existence of the negative torque condition.

9. The system according to claim 1, wherein the control device is adapted to determine a vehicle speed, wherein the vehicle speed is a parameter used by the control device to determine the existence or absence of the negative torque condition.

10. The system according to claim 9. wherein the vehicle speed is used to calculate a vehicle acceleration, and wherein the vehicle acceleration is a parameter used by the system to signal engagement of said one or more clutches.

11. A system for controlling the engagement and disengagement of a clutch adapted to operatively connect an engine and an automatic transmission, the system comprising:
   a torque convener coupling an engine to an automatic transmission,
   a control device comprised of an engine controller and a transmission controller;
   an engine speed sensor in communication with the engine controller and adapted to provide a signal associated with a current rotational speed of said engine; and
   a torque converter turbine output shaft sensor in communication with the transmission controller and adapted to provide a signal associated with a current rotational speed of said transmission;
   wherein the control device determines whether a negative torque condition exists based upon signals Or information received from or provided by the engine controller and the transmission controller, and
   wherein said clutch selectively disengages said automatic transmission putting the automatic transmission into neutral gear, when the control device determines or signals the existence of the negative torque condition.

12. The system according to claim 11, wherein the negative torque condition exists when the control device determines the current rotational speed of said transmission is greater than the current rotational speed of said engine based upon signals or information provided by the engine controller and the transmission controller.

13. The system according to claim 11, further including a vehicle speed sensor in communication with the control device, wherein die speed sensor is adapted to determine or signal a current vehicle speed, including when the vehicle is experiencing a neutral coast condition.

14. The system according to claim 11, further including an accelerator pedal sensor in communication with the engine controller, wherein the accelerator pedal sensor is adapted to signal or determine a position or degree of depression of an accelerator pedal; the control device is adapted to determine the existence or absence of a neutral coast condition based, in part, upon parameters received from the accelerator pedal sensor; and said clutch is selectively engaged or disengaged based upon the neutral coast condition.

15. The system according to claim 11, further including a brake pedal sensor in communication with the control device,
   wherein the brake pedal sensor is adapted to signal or determine a position or degree of depression of a brake pedal; the control device is adapted to determine the existence or absence of a neutral coast condition based upon parameters received from the brake pedal sensor; and said clutch is selectively engaged or disengaged based upon the existence of the neutral coast condition.

16. The system according to claim 11, wherein said clutch is selectively pressurized to a select or predetermined pressure during the existence of the negative torque condition prior to re-engagement to the automatic transmission and said clutch is re-engaged putting the automatic transmission into gear when the negative torque condition no longer exists.

17. A method of controlling engagement and disengagement of one or more clutches for a powertrain system of a vehicle comprising;
   (a) providing a (1) powertrain system that comprises an automatic transmission coupled by a torque convener to an engine with the automatic transmission having a plurality of gear-selection clutches, and (2) a control device monitoring operation of the engine and transmission that comprises at least one of a transmission controller and an engine controller;
   (b) determining whether a negative torque condition exists;
   (c) releasing each one of die plurality of gear-selection clutches if the negative torque condition is determined to exist, putting the automatic transmission into a neutral gear condition;

(d) lowering speed of the engine while the automatic transmission is in the neutral gear condition; and (e) re-engaging at least one of the plurality of gear-selection clutches putting the automatic transmission into gear upon determining that the negative torque condition no longer exists.

18. The method according to claim 17, wherein the control device comprises an engine controller and step (d) comprises sending of a signal from the engine controller to lower the speed of the engine.

19. The method according to claim 17, wherein the negative torque condition exists when a current rotational speed of said automatic transmission is higher than a current rotational speed of said engine, and wherein the releasing each one of the plurality of gear-selection clutches if the negative torque condition is determined to exist in step (c) causes each engaged gear-selection clutch to disengage from said automatic transmission putting said automatic transmission into neutral gear.

20. The method according to claim 17, farther including an electronic throttle control for signaling or providing a position or degree of opening of an engine throttle and a vehicle speed sensor for signaling or providing a vehicle speed, wherein an appropriate one or more of the clutches is selected and released in step (c) based upon signals or input provided by the electronic throttle control and the vehicle speed sensor.

21. The method according to claim 17, wherein before step (e), comprising the further step of applying a select or predetermined amount of pressure to an appropriate one of the gear-selection clutches during the existence of the negative torque condition and comprising during step (e) applying pressure to re-engage at least one of the plurality of gear-selection clutches when a rate of acceleration of the vehicle exceeds a select or predetermined amount putting the automatic transmission of the powertrain system into gear.

* * * * *